(12) United States Patent
Kanter et al.

(10) Patent No.: US 8,576,241 B1
(45) Date of Patent: Nov. 5, 2013

(54) COLOR PALETTE MAPS FOR COLOR-AWARE SEARCH

(75) Inventors: Max L Kanter, Redmond, WA (US);
Sachin B. Singh, Seattle, WA (US);
Michel Goldstein, Bellevue, WA (US);
Carl N. Meister, Seattle, WA (US);
David Charles Couvrette, Seattle, WA (US); Walter Manching Tseng, Redmond, WA (US); Blair L. Hotchkies, Bellevue, WA (US); Sarah E. Williams, Seattle, WA (US);
Sikandar Saifullah, Issaquah, WA (US);
Sean P. Forde, Seattle, WA (US); John M. Nilles, Poulsbo, WA (US); Jason P. Patrikios, Seattle, WA (US); Brent Robert Mills, Seattle, WA (US);
Alexandru I. Indrei, Seattle, WA (US);
Paul Daniel Jaye, Seattle, WA (US);
Daniel R. Parshall, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 947 days.

(21) Appl. No.: 12/699,735

(22) Filed: Feb. 3, 2010

(51) Int. Cl.
*G09G 5/00* (2006.01)
*G09G 5/02* (2006.01)
*H04N 17/00* (2006.01)
*H04N 5/46* (2006.01)
*G03F 3/08* (2006.01)
*G06K 9/00* (2006.01)
*G06K 9/40* (2006.01)
*G06K 9/60* (2006.01)
*G06F 7/00* (2006.01)

(52) U.S. Cl.
USPC .......... 345/589; 345/593; 345/611; 345/619;
348/179; 348/557; 358/518; 382/167; 382/251;
382/254; 382/266; 382/305; 707/708; 707/758;
707/769

(58) Field of Classification Search
USPC ......... 345/418, 581, 589–593, 597, 600–601,
345/606, 611–612, 619, 501, 522, 548–549,
345/690; 348/179, 498, 502, 519–520, 552,
348/557, 577, 582, 599, 630, 716–717;
358/515, 518–519, 523, 525, 448;
382/162–167, 228, 251, 254, 260, 266,
382/269, 274, 276, 300, 305; 707/705–708,
707/758, 763, 769–771, 778
See application file for complete search history.

(56) References Cited

U.S. PATENT DOCUMENTS

| | | | |
|---|---|---|---|
| 5,748,764 A * | 5/1998 | Benati et al. ................. | 382/117 |
| 6,246,804 B1 * | 6/2001 | Sato et al. ..................... | 382/284 |
| 6,741,655 B1 * | 5/2004 | Chang et al. ............. | 375/240.26 |
| 7,421,125 B1 * | 9/2008 | Rees ............................. | 382/181 |
| 2003/0174882 A1 * | 9/2003 | Turpin et al. ................. | 382/162 |
| 2008/0044081 A1 * | 2/2008 | Lieb ............................. | 382/162 |

(Continued)

*Primary Examiner* — Wesner Sajous
(74) *Attorney, Agent, or Firm* — Novak Druce Connolly Bove + Quigg LLP

(57) ABSTRACT

Effective color-aware search of a collection of content associated with one or more images is enabled. Content and/or its associated images may be automatically associated with representative palette colors in a suite of color palettes. Color palettes may be of a variety of types and have a hierarchical structure in which lower levels enable increasingly subtle distinctions between shades of color. Color palette hierarchies may be effectively presented, and appropriate portions emphasized based on associated search result sets. Search result sets may be refined and/or reordered in accordance with color palette selections and/or representative confidences of color palette selections for items at least referenced therein.

21 Claims, 12 Drawing Sheets

(56) References Cited

U.S. PATENT DOCUMENTS

| | | |
|---|---|---|
| 2008/0046409 A1* | 2/2008 | Lieb .................................. 707/3 |
| 2008/0046410 A1* | 2/2008 | Lieb .................................. 707/3 |
| 2010/0225935 A1* | 9/2010 | Minchew et al. ............... 358/1.9 |
| 2011/0058748 A1* | 3/2011 | Trifonov et al. ............... 382/199 |

* cited by examiner

COLOR PALETTE MAPS FOR COLOR-AWARE SEARCH

BACKGROUND

It has become commonplace to search large collections of electronic records for items of interest. Such items may be associated with one or more colors. For example, the items may include physical objects having a primary color and one or more secondary colors. Accordingly, it may be desirable to search by item color as well as other item attributes. However, conventional solutions that facilitate searching by item color have shortcomings.

Some conventional solutions require that one or more colors associated with an item be manually described with one or more words of a language such as English. Such manual description of item colors can be labor intensive and error prone. In addition, the words chosen by one person to describe a color of an item are not necessarily the words that will be chosen by another person searching for items of that color. For example, "purple" and "violet" might be used by different people to describe the same color.

Now it is not uncommon for electronic records to include images of the items of interest, for example, digitized color photographs of various items, objects, or other suitable content. Such images may include many pixels each having a color, which is commonly chosen from one of a number of high resolution color spaces. A 32-bit color space has over 4 billion colors, and even a 16-bit color space has over 65 thousand colors. Although a person searching may think of, for example, an apple as red or green, digital photographs of apples may include thousands of shades of red, green, blue and yellow depending on, for example, lighting and background. A naïve implementation of a color-aware search of such images may produce results that are unsatisfactory, unexpected and/or confusing for a search system user.

Neither is the user interface to such a search system necessarily straightforward. Some conventional solutions provide a presentation of the entire color space. However, for many users, such a presentation is unnatural and/or difficult to use to obtain results that, again, are not unsatisfactory, unexpected and/or confusing. For some search applications, user frustration may have significant negative consequences, for example, negative commercial consequences including loss of a sale.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
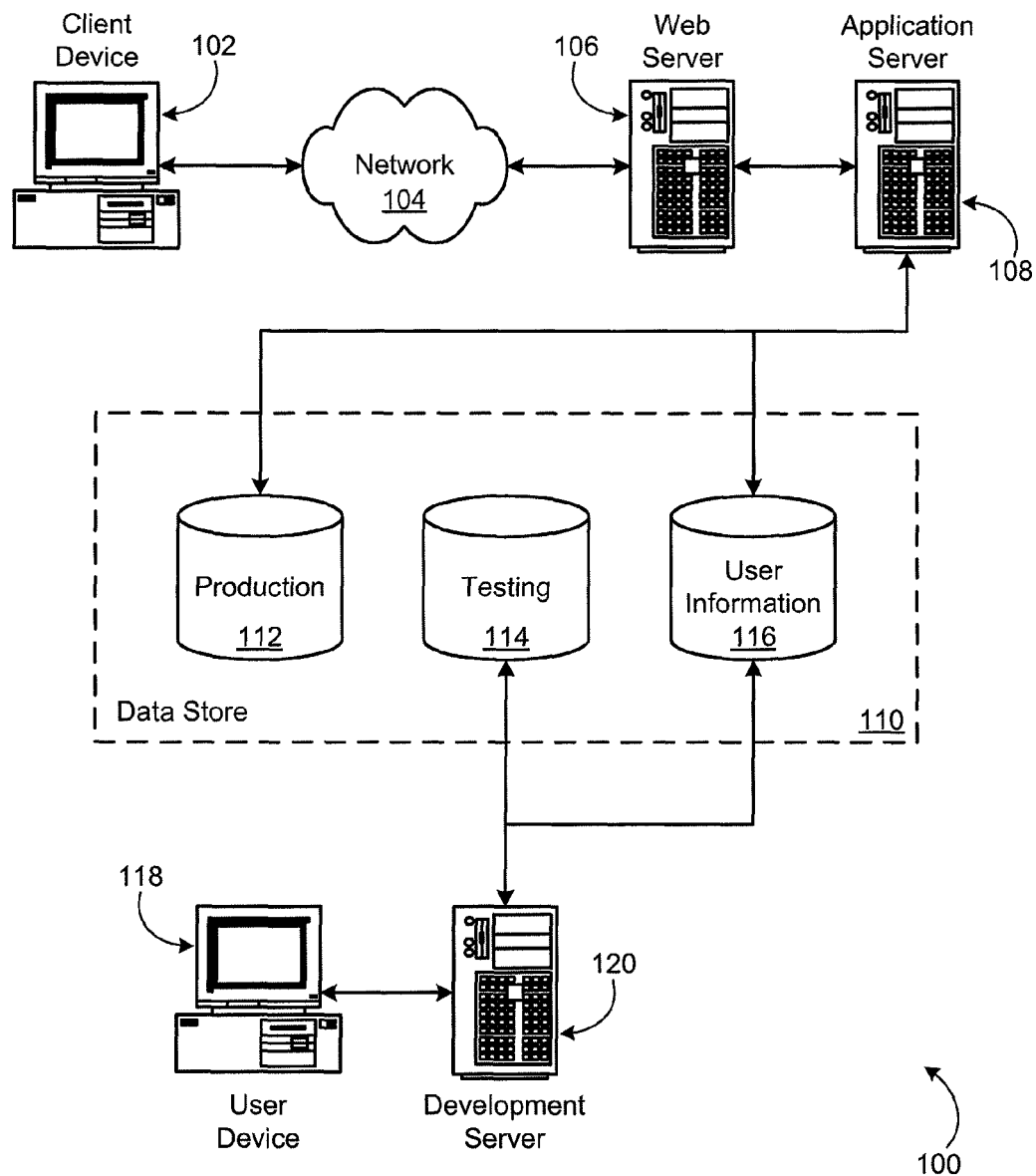
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In at least one embodiment, effective color-aware search of a collection of content associated with one or more images may be enabled at least in part by associating the collection of content and/or its associated images with representative palette colors in a suite of color palettes. Images associated with the collection of content may be analyzed to determine a distribution of associated colors (e.g., content color signatures) in a high-resolution color space. The suite of color palettes may be established for the color space and/or the collection of content. Colors associated with content and/or its associated images may be mapped to representative palette colors, for example, utilizing color palette maps.

A color palette may include a relatively few colors of the color space. The palette colors of the color palette may be chosen to provide a coarse grain coverage of the color space and/or the color distribution associated with the collection of content. The palette colors of the color palettes may be chosen manually, for example by an expert with respect to a particular type of content, or generated automatically, for example, by clustering the color distribution at suitable granularities. Each color palette may be of a distinct type. For example, color palette types may include color palettes designed for particular seasons, events, fashions, themes and content categories.

Color palettes having relatively few palette colors may facilitate searching of the collection of content associated with one or more images by people. However, it may be that the collection of content includes a set of content associated with relatively similar colors, and that additional palette colors would aid human discernment. For example, the collection of content may include a collection of items of apparel such as a collection of jeans available in several shades of blue. Accordingly, search of the collection of content associated with one or more images may be further facilitated in accordance with at least one embodiment by color palettes having a hierarchical structure. To continue the example, a suitable color palette hierarchy may include a first level including palette colors corresponding to black, blue, green and red, as well as a second level including palette colors corresponding to navy blue, cobalt blue, steel blue, and cornflower blue.

Color palettes in accordance with at least one embodiment may enable people engaged in search to efficiently discern differences between colors associated with content in which they are interested. Palette colors need not correspond to similarly sized regions of the color space, and may provide any suitable level of granularity with respect to the color distribution associated with the collection of items. Such color palettes, including color palette hierarchies, may be efficiently presented. For example, color palette hierarchies may be interactive, with lower levels presented responsive to user interest. Portions of color palettes may be emphasized corresponding to contents of a search result set. Furthermore, an associative confidence ("representative confidence") may be determined for each palette color and taken into account when generating search result sets. For example, a search for navy blue apparel items may generate a result set in which items for which a navy blue palette color has a high representative confidence are more highly ranked. The example of items associated with one or more representative images ("imaged items"), particularly where the items correspond to physical objects and the representative images include a set of pixels corresponding to those physical objects, is a helpful example, and is used herein for clarity. However, as will be appreciated by one of skill in the art, this is not a limiting example, and any suitable content associated with one or more images may be incorporated in accordance with at least one embodiment.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, set-top boxes, personal data assistants, electronic book readers, and the like. The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any appropriate combination and number of data servers, databases, data storage devices, and data storage media, in any standard, distributed, or clustered environment. The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example. The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
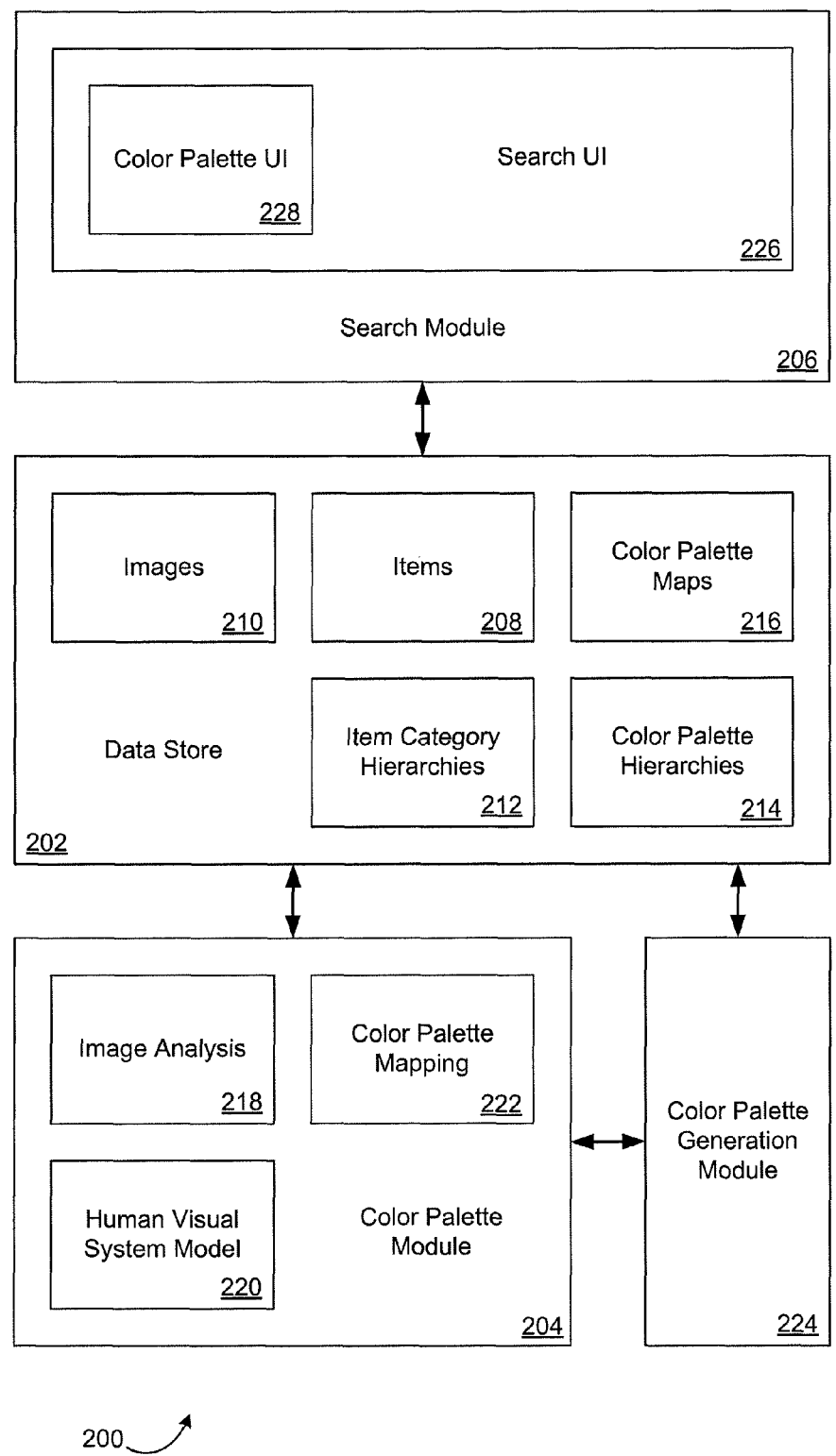
FIG. 2 is a schematic diagram depicting aspects of an example system in accordance with at least one embodiment.

It will be helpful to have reference to an example system configured to facilitate color aware search with color palettes in accordance with at least one embodiment. FIG. 2 depicts salient aspects of an example system 200 in accordance with at least one embodiment. The system 200 may include a data store 202 updated by a color palette module 204 and/or a color palette generation module 224 and utilized by a search module 206. For example, the data store 202 may be incorporated into and/or be implemented by the data store 110 of FIG. 1, the color palette module 204 and/or the color palette generation module 224 may be incorporated into and/or be implemented by the development server 120 and/or the application server 108, and the search module 206 may be incorporated into and/or be implemented by the application server 108 and/or the web server 106. The arrows shown in FIG. 2 between the data store 202 and the color palette, color palette generation and search modules 204, 224, 206 indicate that the data store 202 and the color palette, color palette generation and search modules 204, 224, 206 are communicatively coupled, for example, by a network.

The data store 202 may store a collection of items 208 and a collection of images 210. At least some of the items 208 may be associated with one or more of the images 210. The data store 202 may further store one or more item category hierarchies 212 each categorizing the items 208 into a plurality of item categories. Still further, the data store 202 may store one or more color palette hierarchies 214 and one or more color palette maps and/or mappings ("maps") 216. The color palette maps 216 may correspond to data associating items to representative palette colors in the color palette hierarchies 214.

The color palette module 204 may include an image analysis module 218 for analyzing the images 210 associated with the items 208. The color palette module 204 may further include a human visual system model 220 utilized, for example, by the image analysis module 218. Still further, the color palette module 204 may include a color palette mapping module 222 capable of, for example, updating the color palette maps 216 based at least in part on image analysis data provided by the image analysis module 218. The color palette generation module 224 may generate one or more of the color palette hierarchies 214.

The search module 206 may facilitate color-aware search of the items 208 in the data store 202. The search module 206 may include a search user interface (UI) module 226 facilitating user interaction with the search module 206. The search UI module 226 may include a color palette user interface (UI) module 228 that facilitates color palette related aspects of a search user interface. An example search user interface in accordance with at least one embodiment is described below with reference to FIG. 4.

The collection of items 202 may include any suitable items. Examples of suitable items include electronic records of physical and virtual objects including documents, electronic documents and commercial objects corresponding to goods and/or services, references thereto including reference by uniform resource locator (URL), and suitable combinations thereof. Unless otherwise indicated, or made clear by context, the term "item" as used herein may refer to an item itself, an electronic record associated with the item and/or a reference to the item.

The collection of images 210 may include any suitable image in any suitable image format. Examples of suitable images include images of physical and virtual objects including documents, electronic documents and commercial objects corresponding to goods and/or services. Examples of suitable image formats include electronic image formats such as digital image formats including raster formats such as bitmaps (e.g., BMP), compressed images in accordance with a Joint Photographic Experts Group (JPEG) standard, graphics interchange formats (e.g., GIF), and portable network graphics formats (e.g., PNG), as well as rasterizable vector formats such as computer graphics metafile formats (e.g., CGM) and scalable vector graphics formats (e.g., SVG).

The images 210 associated with the items 208 may be representative of the items 208, for example, graphical presentations of the items 208 and/or digital color photographs of the items 208. The images 210 may be in accordance with an item imaging specification. For example the item imaging specification may specify that an image in the collection of images 210 should be representative of no more than one item in the collection of items 208, that the item occupy a particular proportion of a rendering of the image (e.g., greater than two thirds), that a background of the image be a particular color (e.g., a shade of white found rarely in nature), and/or, where applicable, that the image be captured under particular lighting conditions (e.g., lighting conditions similar to bright daylight).

The item category hierarchies 212 may include any suitable item category. Examples of suitable item categories include categories corresponding to item type, item purpose, item use and item location, categories corresponding to users, owners and/or consumers of items, and suitable combinations thereof. Particular item categories in the item category hierarchies 212 may have one or more parent categories and/or one or more child categories. Root categories of the item category hierarchies 212 may have no parent categories. Leaf categories may have no child categories. An item category may be considered include items categorized into one of its child categories. Items categories may be associated with a particular level in an item category hierarchy. For example, the level of a particular item category may correspond to a path length in the item category hierarchy from the item category to a root category. The item category hierarchy may include an all-items root category, which may be associated with a level zero in the item category hierarchy.

Each of the color palette hierarchies 214 may include a plurality of palette colors arranged in a hierarchical structure having a plurality of levels. However, each embodiment need not be so limited. For example, in at least one embodiment the color palette hierarchies 214 may include one or more color palette hierarchies having a single level. An example color palette hierarchy is described below in more detail with reference to FIG. 3. For clarity, the example system 200 shows the color palette maps 216 associating ones of the items 208 to palette colors in the color palette hierarchies 214 as distinct entities in the data store 202. However, in at least one embodiment, the color palette maps 216 and/or data corresponding thereto may be incorporated into other entities stored by the data store 202, for example, the items 208, the item category hierarchies 212 and/or the color palette hierarchies 214.

The image analysis module 218 may analyze the images 210 to produce color signatures for items associated with the images 210. For example, the image analysis module 218 may identify representative subsets of pixels in images for items, quantize colors (e.g., with respect to the human visual system model 220), bias for and/or against sets of colors such as colors associated with an image background and grayscale colors, filter sets of colors for noise, and/or perform any suitable image analysis and/or processing technique. The human visual system model 220 may include any suitable model of a human visual system including color space transformations that correspond to human visual sensitivities (e.g., with respect to item categories) and empirically determined parameter values utilized by the color palette module 204. The human visual system model 220 may include a color space in accordance with a human visual system model such as an HSV color space.

The color palette mapping module 222 may map a color signature for an item to a representative set of palette colors in the color palette hierarchies 214. A number of colors in the color signature for the item may be relatively large with respect to a desired number of representative palette colors. The color palette mapping module 222 may select the desired number of representative palette colors at least in part by utilizing a multi-threshold procedure described below in more detail. The color palette mapping module 222 may also determine representative confidences of palette colors for ones of the items 208.

The color palette hierarchies 214 may be specified manually. Alternatively, or in addition, at least some of the color palette hierarchies 214 may be automatically generated, at least in part. The color palette generation module 224 may facilitate automated color palette hierarchy generation at least in part by utilizing color signatures for items generated by the image analysis module 218. For example, the color palette generation module 224 may aggregate the color signatures for the collection of items 208 and cluster the aggregate at various granularities. A palette color may be chosen from a cluster center as representative of colors in the cluster. Levels of a color palette hierarchy may correspond to aggregate clusterings of increasingly fine granularity. Connections between levels of the color palette hierarchy may correspond to overlaps by clusters from aggregate clusterings of different granularity. Cluster granularity may be varied between levels of the color palette hierarchy so that palette colors in the color palette hierarchy have less than a threshold number of child palette colors.

The search UI module 226 may provide information from the search module 206 for presentation. For example, the search UI module 226 may generate a search user interface (UI) presentation specification and provide the specification to the client device 102 (FIG. 1) through the network 104. The search UI module 226 may specify the search UI presentation with any suitable presentation specification language including suitable hypertext markup languages (e.g., HTML) and suitable programming and/or scripting languages (e.g., JavaScript). An example search UI presentation is described below with reference to FIG. 4, FIG. 5 and FIG. 6. The search UI module 226 may receive information responsive to the search UI presentation. For example, the search UI module 226 may receive search requests and/or refinements from the client device 102. The search UI module 226 may process received requests and activate associated search module 206 functionality in response. For example, the search UI module 226 may identify a search specification including search terms in a search request, invoke search module 206 functionality to generate a search result including a search result set for the search terms, and/or processing any suitable search attribute.

The color palette UI module 228 may provide one or more of the color palette hierarchies 214, or portions thereof, for presentation. For example, the color palette UI module 228 may participate in generation of the search UI presentation by the search UI module 226. In particular, the color palette UI module 228 may specify color palette related aspects of the search UI presentation. Color palette hierarchy presentations specified by the color palette may be interactive. For example, in a particular color palette hierarchy presentation, a first portion of a particular color palette hierarchy may be visible and, responsive to user interact with the first portion, a second portion of the color palette hierarchy may be made visible. The color palette UI module 228 may furthermore parse, interpret and/or respond to color palette related information contained in messages and/or requests received, for example, from the client device 102 (FIG. 1). For example, the color palette UI module 228 may instruct the search module 206 to update a search result set based at least in part on a color palette selection.

Figure 3:
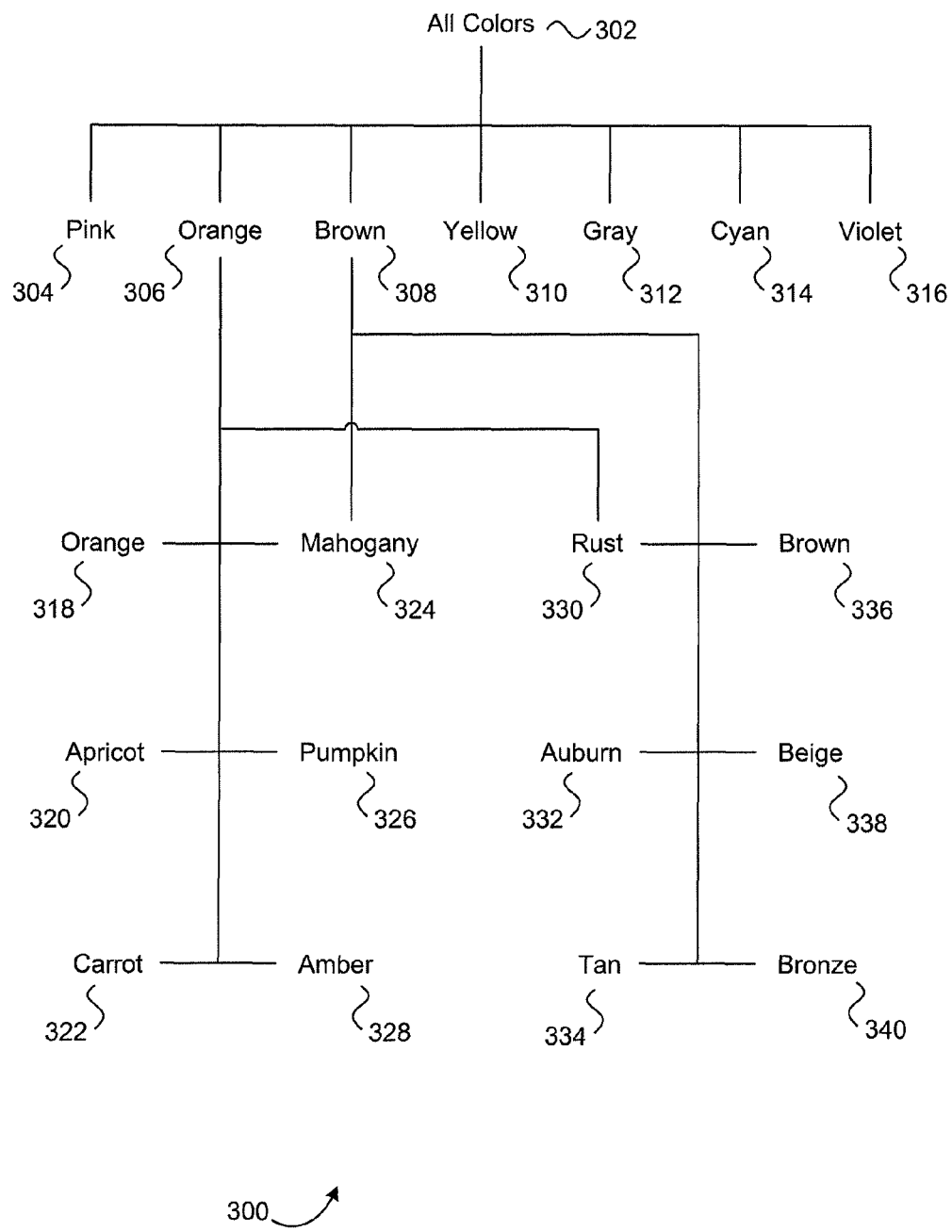
FIG. 3 is a schematic diagram depicting aspects of an example color palette hierarchy in accordance with at least one embodiment.

It will be helpful to have reference to an example color palette hierarchy in accordance with at least one embodiment. FIG. 3 depicts aspects of an example color palette hierarchy 300 in accordance with at least one embodiment. The color palette hierarchy 300 may include an "all colors" root node 302. The "all colors" root node 302 may correspond to a color space, for example, a Lab color space such as a CIELAB color space, an RGB color space, a CMYK color space, an HSV color space, an HSL color space, and/or any suitable color space. Regions and/or distances within the color space may be determined with respect to any suitable color space metric. Examples of suitable color space metrics include Euclidean metrics, Manhattan metrics such as Minkowski's $L_1$ distance, Taxicab metrics, and metrics based at least in part on arithmetic means.

The example color palette hierarchy 300 includes a pink palette color 304, an orange palette color 306, a brown palette color 308, a yellow palette color 310, a gray palette color 312, a cyan palette color 314 and a violet palette color 316. Of course, color palette hierarchies in accordance with at least one embodiment may include additional, fewer, and/or alternative palette colors. These palette colors 304, 306, 308, 310, 312, 314, 316 may be child nodes of the "all colors" root node 302 in the color palette hierarchy 300. The palette colors 304, 306, 308, 310, 312, 314, 316 may be understood as residing at a first level of the color palette hierarchy 300. The palette colors 304, 306, 308, 310, 312, 314, 316 may correspond to a clustering of colors in color signatures of the items 208 (FIG. 2) at a first granularity. The palette colors 304, 306, 308, 310, 312, 314, 316 may correspond to regions of the color space, for example, regions containing colors in the color signatures of the items 208. For example, the cyan palette color 314 may correspond to a region of the color space that contains the color cyan. The palette colors 304, 306, 308, 310, 312, 314, 316 may correspond to regions of the color space that form a covering of the colors in the color signatures of the items 208. The palette colors 304, 306, 308, 310, 312, 314, 316 need not correspond to equally sized regions of the color space.

The color palette hierarchy 300 may further include an orange palette color 318, an apricot palette color 320, a carrot palette color 322, a mahogany palette color 324, a pumpkin palette color 326, an amber palette color 328, a rust palette color 330, an auburn palette color 332, a tan palette color 334, a brown palette color 336, a beige palette color 338, and a bronze palette color 340. These palette colors 318, 320, 322, 324, 326, 328, 330, 332, 334, 336, 338, 340 may be understood as residing at a second level of the color palette hierarchy 300. The palette colors 318, 320, 322, 324, 326, 328, 330, 332, 334, 336, 338, 340 may correspond to a clustering of colors in color signatures of the items 208 (FIG. 2) at a second granularity finer than the first granularity. The color palette hierarchy 300 may include further palette colors not shown in FIG. 3 for clarity. In particular, the color palette hierarchy 300 may include further palette colors at the second level, as well as at any suitable number of subsequent levels. Palette colors at lower levels may be understood as being beneath palette colors at higher levels. Although not shown in FIG. 3, the color palette hierarchy may further include one or more palette multicolors, that is, single color palette elements that correspond to multiple distinct regions of the color space. A single palette multicolor may correspond to, for example, blue and white, yellow and blue, red and gold, red, white and blue, and so on. As an example, palette multicolors may correspond to identifying colors of flags, sports teams, corporate logos, and the like.

In the color palette hierarch 300, the palette colors 318, 320, 322, 324, 326, 328, 330 are child nodes of the orange palette color 306, and the palette colors 324, 330, 332, 334, 336, 338, 340 are child nodes of the brown palette color 308. The palette colors 318, 320, 322, 324, 326, 328, 330, 332, 334, 336, 338, 340 may correspond to regions of the color space, for example, regions containing colors in the color signatures of the items 208 (FIG. 2). The palette colors 318, 320, 322, 324, 326, 328, 330, 332, 334, 336, 338, 340 at the second level of the color palette hierarchy 300 may correspond to regions of the color space that overlap regions of the color space to which the palette colors 304, 306, 308, 310, 312, 314, 316 at the first level of the color palette hierarchy 300 correspond. For example, the color space regions to which the palette colors 318, 320, 322, 324, 326, 328, 330 correspond may overlap the color space region to which the orange palette color 306 corresponds.

The orange palette color 306 at the first level of the color palette hierarchy 300 need not correspond to a same color space region as the orange palette color 318 at the second level of the palette color hierarchy 300. Similarly, the brown palette color 308 at the first level of the color palette hierarchy 300 need not correspond to a same color space region as the brown palette color 336 at the second level of the palette color hierarchy 300. For example, the orange palette color 318 at the second level of the color palette hierarchy 300 may correspond to a smaller color space region than the orange palette color 306 at the first level of the color palette hierarchy 300. Palette colors at the second level of the color space hierarchy 300 may be child nodes of more than one palette colors at the first level of the color palette hierarchy 300. For example, the mahogany palette color 324 may be a child node of the orange palette color 306 and the brown palette color 308. The rust palette color 330 may also be a child node of the orange palette color 306 and the brown palette color 308. For example, the color space region to which the mahogany palette color 324 corresponds may overlap the color space regions to which the orange palette color 306 and the brown palette color 308 correspond.

Figure 4:
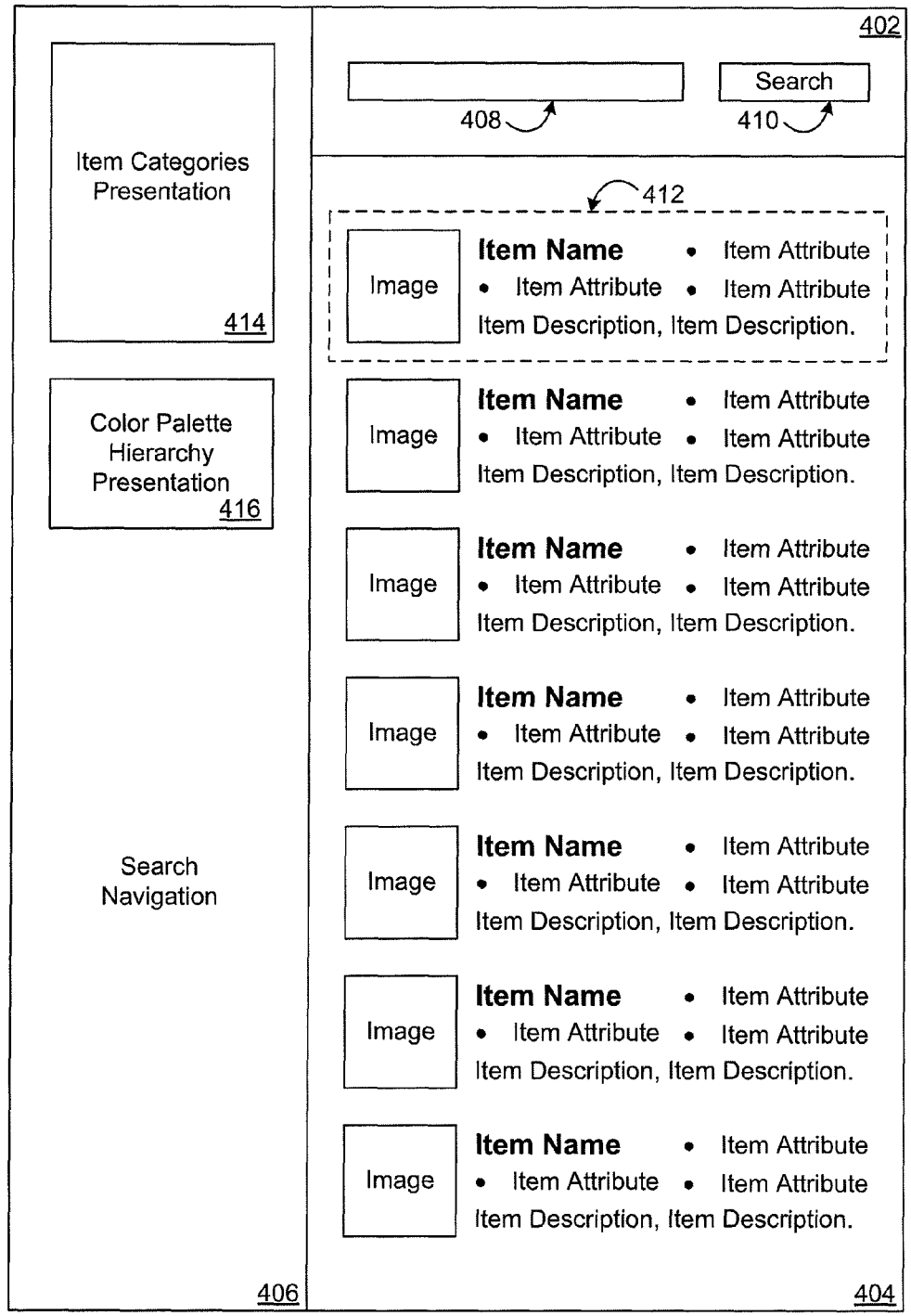
FIG. 4 is a schematic diagram depicting aspects of an example user interface in accordance with at least one embodiment.

The palette color hierarchy 300 is an example of one of the color palette hierarchies 214 of FIG. 2. The palette color hierarchy 300, or portions thereof, may be presented, for example, to a user of the system 200 in a user interface facilitated by the color palette UI module 228. FIG. 4 depicts aspects of an example user interface 400 in accordance with at least one embodiment.

The user interface 400 may include graphical user interface (GUI) components such as a search input component 402, a search result component 404 and a search navigation component 406. However, each embodiment need not be so limited. The user interface 400 may incorporate any suitable user interface (UI) component Examples of suitable user interface components include, but are not limited to, components configured to cause, monitor, alter and/or suppress a human perception and/or a human sensory event including visual perceptions, auditory perceptions, tactile perceptions and kinesthetic perceptions. For example, the user interface 400 may be presented to the user by the client device 102 of FIG. 1.

The search input component 402 may include a text input component 408 and a search submission component 410. The search result component 404 may include a plurality of search result presentations such as the search result presentation 412. The search navigation component 406 may include an item categories presentation 414 and a color palette hierarchy presentation 416. The search input component 402, the search result component 404 and the search navigation component 406 may be visually differentiated, for example, by a displayed location, a visual grouping and/or one or more explicit elements of visual separation and/or differentiation. In the example user interface 400, visual presentation areas associated with the search input component 402, the search result component 404 and the search navigation component 406 are contiguous. However, each embodiment need not be so limited. For example, aspects of the item categories presentation 414 may be incorporated into the visual presentation area associated with the search result component 404.

The user of the user interface 400 may input text with the text input component 408. The text input may be any suitable text. Example of suitable text include one or more strings of alphanumeric characters, one or more strings of symbols such as symbols corresponding to keys of a keyboard, words of a language such as English, and suitable combinations thereof. The text input may correspond to one or more search terms. The search submission component 410 may be selected, for example, to submit the text to the search module 206 of FIG. 2.

The search results presented by the search result component 410 may correspond to one or more search terms input with the text input component 408. For example, the presented search results may be a presentation of a portion of a search result set provided by the search module 206 (FIG. 2) responsive to the submitted search terms. Each presented search result may correspond to an item such as one of the items 208. For example, the search result presentation 412 may include a name of the item (item name), one or more attributes of the item (item attributes), an image for the item (image) and a description of the item (item description). The image for the item may be selected from among the one or more of the images 210 associated with the item. FIG. 4 depicts each of the search results presented by the search result component 410 as having a similar presentation format. However, each embodiment need not be so limited.

The name of the item may be any suitable item identifier. For example, the name may include one or more strings of symbols such as alphanumeric characters and/or words of a language such as a natural language. Presented attributes of the item may be selected from a suitable set of item attributes. Suitability of a particular attribute for presentation may depend on a type of the item, a context of the search, a purpose of the user interface 400 and/or a theme of the user interface 400. For example, the item may be a representation of an electronic document, and suitable item attributes may include one or more authors, a publication date, one or more document statistics including document size, and one or more document location specifications such as uniform resource locators (URLs). As another example, the search may have a commercial context, and suitable item attributes may include one or more availability specifications including a number of items in stock and one or more dates and/or date ranges, one or more quality specifications, one or more prices and/or price components including base price, taxes and delivery costs, one or more popularity scores, and one or more consumer review ratings. The description of the item may include any suitable text including hypertext.

The item categories presentation 414 may present, for example, a portion of one of the item category hierarchies 212 of FIG. 2. The item categories presentation 414 may indicate one or more categories explicitly associated with the search that resulted in the search result set at least partially presented by the search result component 404. The item categories presentation 414 may be interactive. For example, user selection of one or more of the categories presented by the item categories presentation 414 may restrict the search result set to include items in the selected categories.

The color palette hierarchy presentation 416 may present, for example, a portion of one of the color palette hierarchies 214 of FIG. 2. The color palette hierarchy to be presented may be selected from the color palette hierarchies 214 by the color palette UI module 228. The user interface 400 may be associated with a particular color palette hierarchy. Alternatively, the color palette UI module 228 may select the color palette hierarchy to be presented based at least in part on one or more attributes of the search and/or the user conducting the search including the search result set at least partially presented by the search result component 404, the one or more item categories explicitly associated with the search, one or more temporal and/or geo-temporal parameters including local time of day, day of week, season, traditional event, special event, social event, and/or suitable combinations thereof.

The color palette hierarchy presentation 416 may be interactive. In particular, the color palette hierarchy presentation 416 may initially present a first portion of the selected color palette hierarchy, and may present second and subsequent portions responsive to user interaction. Selection of one or more palette colors in the color palette hierarchy presentation 416 may modify the search result set at least partially presented by the search result component 404. For example, the search result set may be refined to include at least references those items 208 (FIG. 2) for which the selected one or more palette colors are representative. Alternatively, or in addition, the search result set may be re-ordered to rank higher (e.g., in presentation order) those items for which the selected one or more palette colors are representative.

Figure 5:
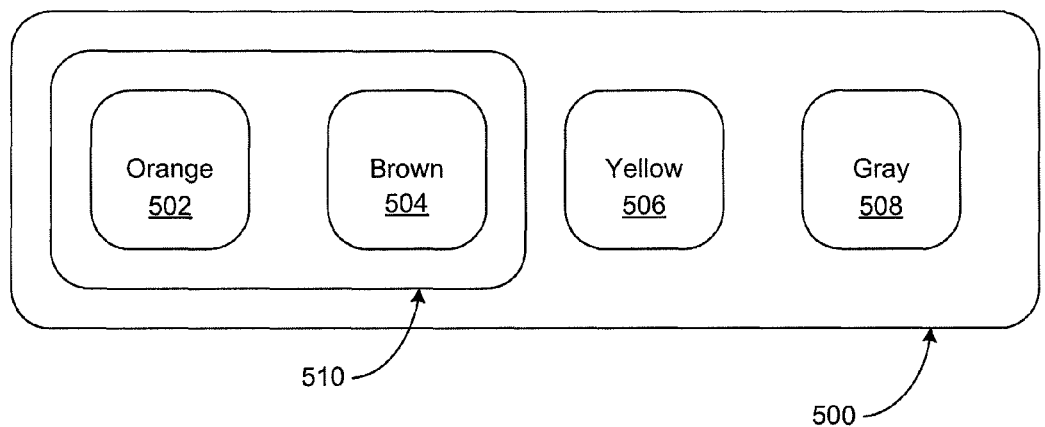
FIG. 5 is a schematic diagram depicting aspects of an example color palette hierarchy presentation in accordance with at least one embodiment.

FIG. 5 depicts aspects of an example color palette hierarchy presentation 500 in accordance with at least one embodiment. For example, the color palette hierarchy presentation 500 may be a presentation of the color palette hierarchy 300 of FIG. 3. The color palette hierarchy presentation 500 may include a plurality of palette color presentations such as an orange palette color presentation 502, a brown palette color presentation 504, a yellow palette color presentation 506 and a gray palette color presentation 508. The palette color presentations 502, 504, 506, 508 may correspond to respective palette colors 306, 308, 310, 312 of the color palette hierarchy 300. Presentations of palette multicolors may include multiple representative color swatches.

The color palette hierarchy presentation 500 may limit a number of visible palette color presentations to less than a threshold. For example, the visible palette color presentations threshold may correspond to an optimal number (e.g., empirically determined) with respect to one or more search goals such as minimizing abandoned searches, maximizing user interaction with item presentations, maximizing one or more particular types of user interaction with item presentations such as viewing item details, commercial goals including sales, and/or suitable combinations thereof. The visible palette color presentations threshold may vary, for example, by color palette, color palette type and/or item category.

Some subset of the visible palette color presentations 502, 504, 506, 508 may be emphasized. For example, as depicted in FIG. 5, the orange palette color presentation 502 and the brown palette color presentation 504 may be visually emphasized with a distinctive presentation region 510. The emphasized subset of the visible palette color presentations 502, 504, 506, 508 may be selected based at least in part on the search result set at least partially presented by the search result component 404 (FIG. 4), one or more item categories explicitly associated with the search result set, and suitable combinations thereof. For example, the emphasized subset may correspond to palette colors that are representative of items at least referenced by the search result set.

The color palette hierarchy presentation 500 may correspond to a first portion of the color palette hierarchy 300 (FIG. 3). For example, the color palette hierarchy presentation 500 may include palette color presentations 502, 504, 506, 508 corresponding to palette colors 306, 308, 310, 312 in the first level of the color palette hierarchy 300. The subset 306, 308, 310, 312 of the palette colors 304, 306, 308, 310, 312, 314, 316 selected for presentation in the color palette hierarchy presentation 500 may be based at least in part on, for example, the search result set at least partially presented by the search result component 404 (FIG. 4), one or more item categories explicitly associated with the search result set, and suitable combinations thereof.

Figure 6:
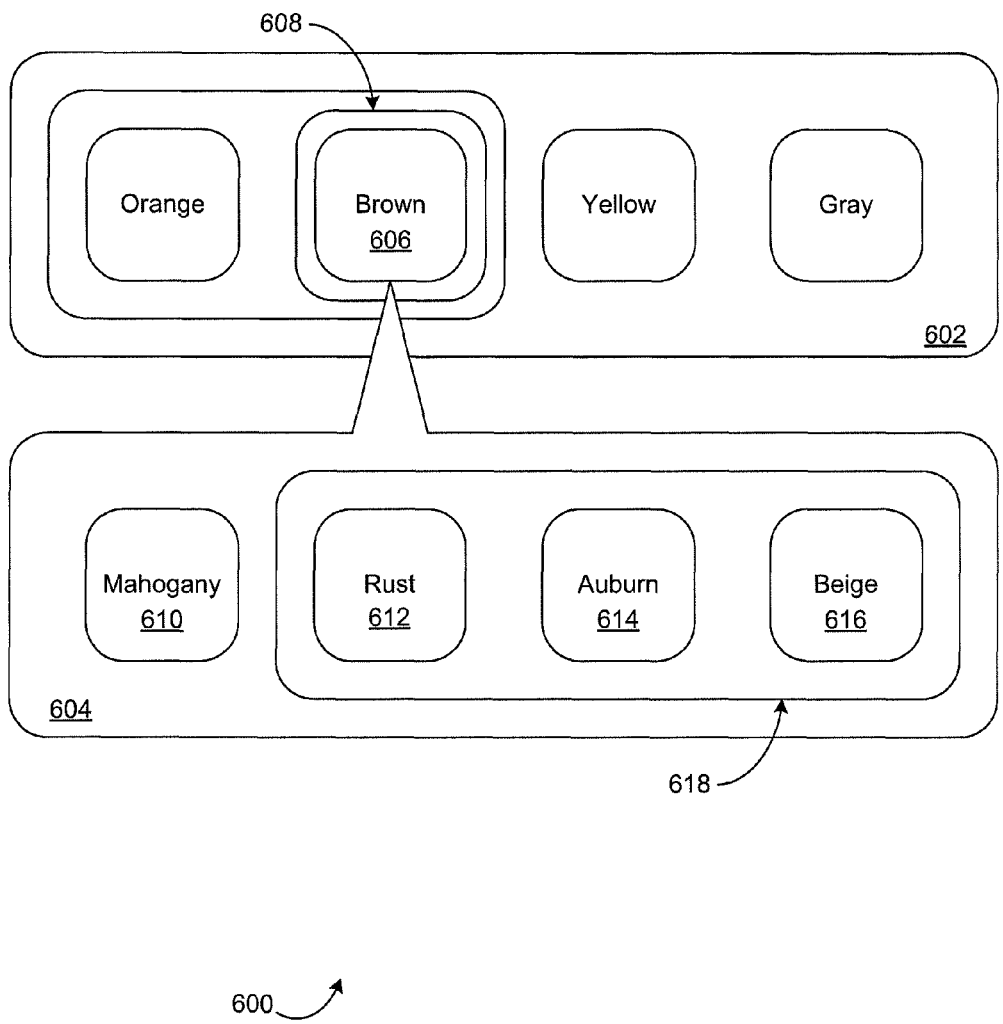
FIG. 6 is a schematic diagram depicting further aspects of the example color palette hierarchy presentation in accordance with at least one embodiment.

The color palette hierarchy presentation 500 may be interactive. One or more of the visible palette color presentations 502, 504, 506, 508 may be selectable. In addition, interaction with (e.g., moving a mouse pointer over) the visible palette color presentations 502, 504, 506, 508 may cause a second portion of the color palette hierarchy 300 (FIG. 3) to be presented. FIG. 6 depicts an example such interaction response in accordance with at least one embodiment.

As with FIG. 5, FIG. 6 depicts aspects of an example color palette hierarchy presentation 600 in accordance with at least one embodiment. A first portion 602 of the color palette hierarchy presentation 600 is intended to correspond to the color palette hierarchy presentation 500 of FIG. 5. In addition, user interaction with the first portion 602 of the color palette hierarchy presentation 600 has resulted in the display of a second portion 604 of the color palette hierarchy presentation 600. For example, the user may be interested in items for which the color brown is representative. Accordingly, the user may indicate interest in (e.g., move a mouse pointer over) a brown palette color presentation 606. In response, the brown palette color presentation 606 may be emphasized (e.g., visually emphasized) with an attention indicator 608. In further response, the second portion 604 of the color palette hierarchy presentation 600 may be displayed.

The second portion 604 of the color palette hierarchy presentation 600 may include a plurality of palette color presentations such as a mahogany palette color presentation 610, a rust palette color presentation 612, an auburn palette color presentation 614 and a beige palette color presentation 616. The palette color presentations 610, 612, 614, 616 may correspond to respective palette colors 324, 330, 332, 338 of the color palette hierarchy 300 (FIG. 3). In the example depicted in FIG. 6, the palette colors of the first portion 602 of the color palette hierarchy presentation 600 are selected from the first level of the color palette hierarchy 300, whereas the palette colors of the second portion 604 are selected from the second level. In addition, the palette colors 324, 330, 332, 338 selected for presentation in the second portion 604 may correspond to child nodes of the brown palette color 308 corresponding to the brown palette color presentation 606 of the first portion 602. As for the first portion 602, the color palette hierarchy presentation 600 may limit a number of visible palette color presentations to less than a threshold (e.g., the same threshold described above with reference to FIG. 5). Also as for the first portion 602, some subset of the visible palette color presentations 610, 612, 614, 618 may be emphasized, for example, with a distinctive presentation region 618.

The description now turns to example steps that may be performed in accordance with at least one embodiment, for example, by the system 200 of FIG. 2. Items 208 categorized into at least one of the item category hierarchies 212 and associated images 210 may be considered as given and/or pre-established. One or more of the color palette hierarchies 214 may be pre-established, however, each embodiment need not be so limited. The color palette maps 216 may be considered as requiring establishment or at least maintenance.

Figure 7:
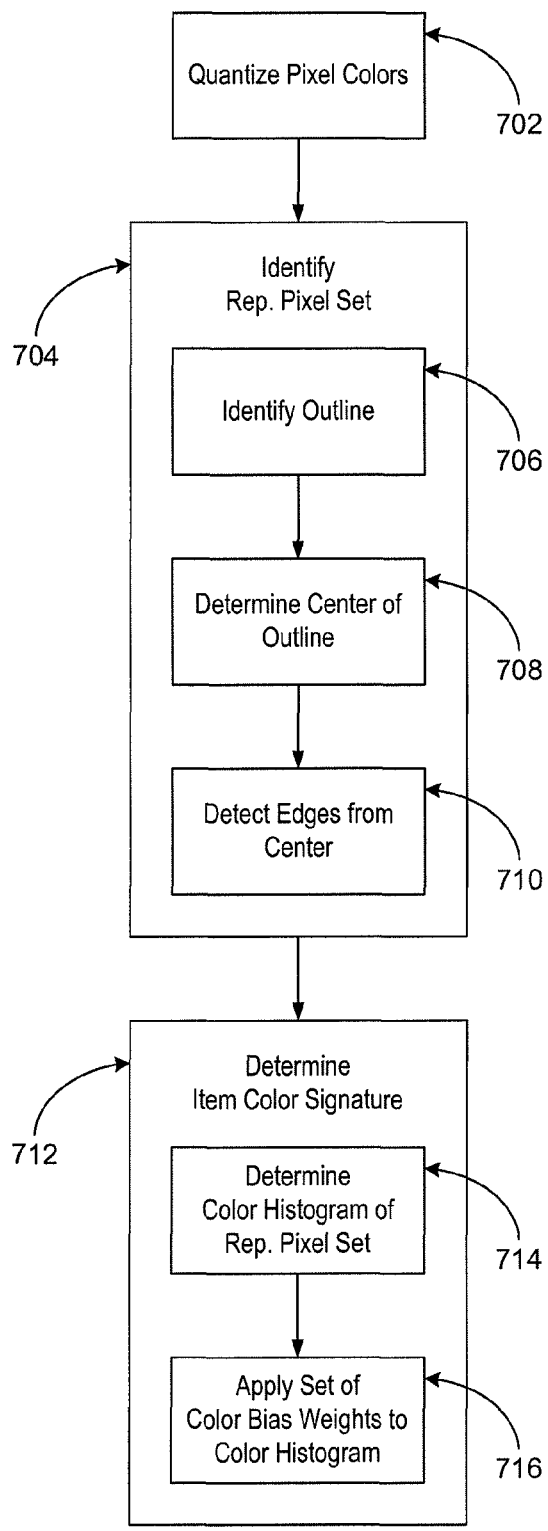
FIG. 7 is a flowchart depicting example steps for processing item images in accordance with at least one embodiment.

The images 210 (FIG. 2) may contain considerable information pertaining to the items 208, particular with respect to color. However, naïve processing of the images 210 may result in representative palette color associations having a poor correlation with user expectations. FIG. 7 depicts example steps for processing images 210 in accordance with at least one embodiment.

As described above, the images 210 (FIG. 2) may include a plurality of pixels having colors chosen from a high resolution color space. Different ones of the images 210 may utilize different color spaces. The steps depicted in FIG. 7 may be performed for any suitable ones of the images 210. At step 702, colors of the pixels of a selected image may be quantized. For example, the image analysis module 218 may quantize the colors in accordance with the human visual system model 220. Quantization may include mapping a region of the high resolution color space to a single quantized color. A size of the regions of the high resolution color space mapped to single quantized colors may correspond to a human ability to distinguish between colors in those regions. In effect, the colors may be mapped to a standardized, possibly lower resolution color space (a quantized color space) in accordance with the human visual system model 220. In at least one embodiment, the quantized color space includes a greater number of distinct colors than at least some of the color palette hierarchies 214.

One or more of the images 210 (FIG. 2) associated with a particular one of the items 208 may include pixels that are not representative of the item. For example, the associated images may include background pixels and/or pixels corresponding to objects unrelated to the item. At step 704, a set of pixels in an associated image that is representative of an item (a representative pixel set) may be identified. For example, the image analysis module 218 may identify the representative pixel set for a given one of the items 208 in a given one of the associated images 210. FIG. 7 depicts example steps 706, 708, 710 that may be performed as at least a part of a performance of step 704. For example, steps such as step 706, step 708 and/or step 710 may be performed to, at least in part, identify one or more image regions to be included in and/or excluded from the representative pixel set.

At step 706, an outline in the image may be identified. For example, the image analysis module 218 (FIG. 2) may identify the outline in the image at least in part by utilizing conventional edge detection techniques while scanning towards a center of the image from one or more boundaries of the image. A set of pixels distinguished by the outline may include the representative pixel set. At step 708, a center of the outline may be determined. For example, the image analysis module 218 may determine a centroid of the set of pixels distinguished by the outline identified at step 706. A step 710, one or more further edges may be detected while scanning outwards from the center determined at step 708. For example, the image analysis module 218 may utilize conventional edge detection techniques to detect the further edges. The further edges may facilitate identification of non representative pixels to exclude from the representative pixel set and/or of contiguous image regions.

At step 712, a color signature may be determined for the item. For example, the image analysis module 218 (FIG. 2) may determine the color signature for the item based at least in part on the quantized colors of pixels in the representative pixel set identified at step 704. FIG. 7 depicts example steps 714, 716 that may be performed as at least a part of a performance of step 712.

At step 714, a color histogram of the representative pixel set identified at step 704 may be determined. For example, the image analysis module 218 (FIG. 2) may determine statistical frequencies of the quantized colors of pixels in the representative pixel set. At step 716, a set of color bias weights may be applied to the color histogram determined at step 714. For example, the image analysis module 218 may apply a set of color bias weights provided by the human visual system model 220. The set of color bias weights may be applied as a linear transformation of corresponding ones of the statistical frequencies in the color histogram. For example, the set of color bias weights may bias against designated background colors and/or grayscale colors. Designated background colors may include colors designated as typical background colors as well as colors explicitly designated for use as background colors such as artificial colors (e.g., "Adobe® Photoshop® white"). In at least one embodiment, flesh tones may be designated as background colors.

Figure 8:
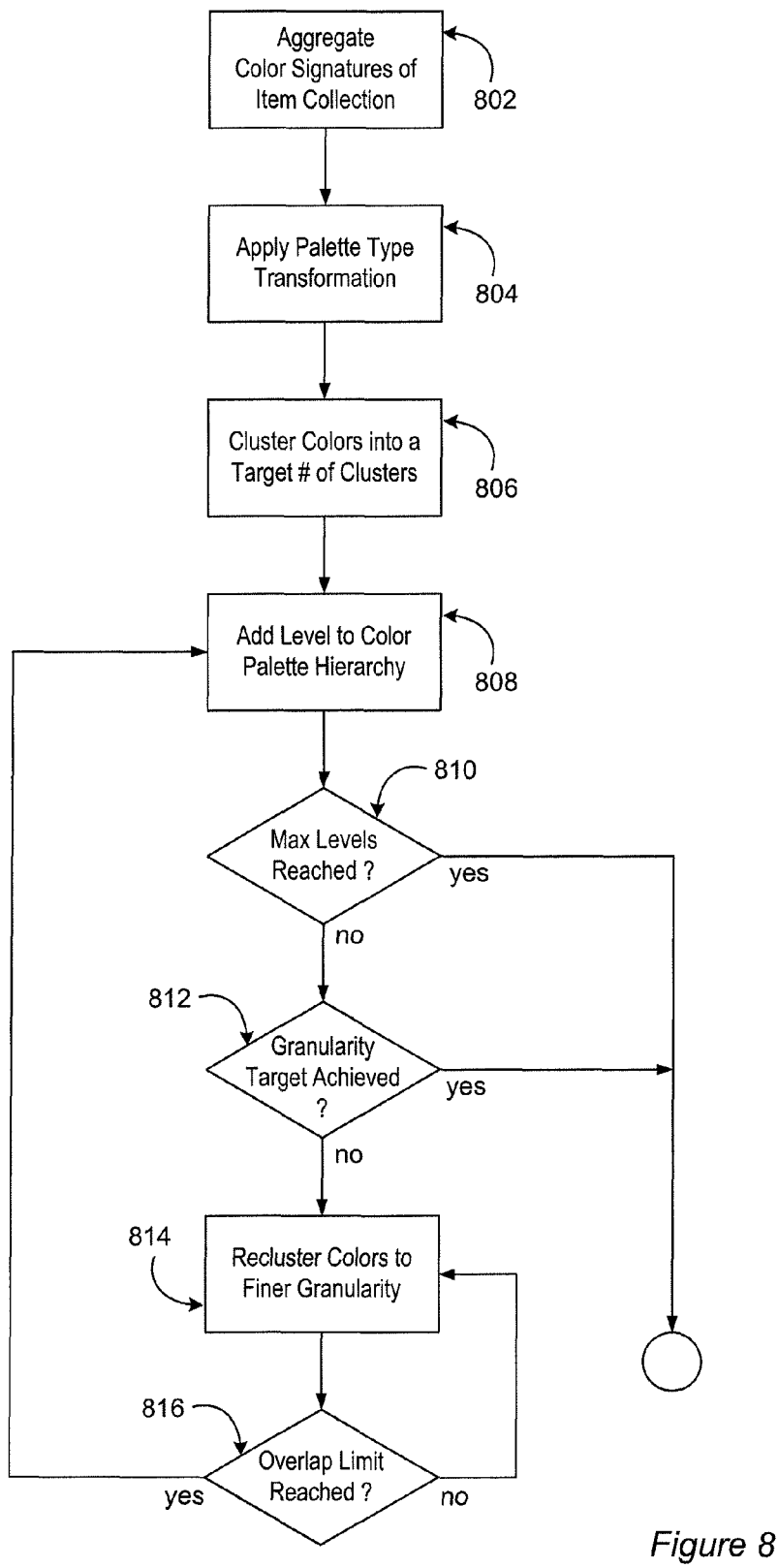
FIG. 8 is a flowchart depicting example steps for generating a color palette hierarchy in accordance with at least one embodiment.

Color signatures determined for ones of the items 208 (FIG. 2) at step 712 may be utilized in a variety of ways. For example, the color signatures may be utilized to generate one or more of the color palette hierarchies 214 for the items 208. FIG. 8 depicts example steps for generating one of the color palette hierarchies 214 in accordance with at least one embodiment. Suppose the image analysis module 218 (FIG. 2) has determined a set of color signatures for the items 208. At step 802, the color signatures for the items 208 may be aggregated. For example, colors in the color signatures may be aggregated as points in a color space.

As described above, color palettes may be of distinct types. Distinct color palette types may emphasize different regions of the color space. For example, seasonal color palette types may emphasize corresponding seasonal colors. Color palette types generated for particular events may emphasize corresponding event theme colors (e.g., sports team colors). A color palette type generated for men's shoes might focus on shades of brown and black. At step 804, a color palette type transformation may be applied to the color signature aggregate and/or the underlying color space. The color palette type transformation may include any suitable color space transformation. Examples of suitable color space transformations include linear and nonlinear transformations, magnifications, expansions, contractions, stretches, distortions, and suitable combinations thereof.

At step 806, the color signature aggregate (optionally transformed at step 804) may be clustered into a target number of clusters. For example, the color palette generation module 224 (FIG. 2) may cluster the points in the color space corresponding to colors in the color signature aggregate with respect to distance in the color space. At step 806, the target number of clusters may correspond to a target number of palette colors for a first level of the color palette hierarchy to be generated. At step 808, a level may be added to the color palette hierarchy. For example, the color palette generation module 224 may select a color from each of the clusters identified at step 806 to be a palette color in the first level of the color palette hierarchy. Any suitable color in an particular cluster may be selected to be the corresponding palette color. For example, the color palette generation module 224 may select a color nearest a centroid of the cluster to be the corresponding palette color.

The color palette generation module 224 (FIG. 2) may be configured to generate color palette hierarchies having a number of levels less than a hierarchy depth threshold. At step, it may be determined if a maximum number of levels has been added to the color palette hierarchy at step 808. If the maximum number of levels has been added to the color palette hierarchy, a procedure incorporating step 810 may progress to one or more steps not shown in FIG. 8. Otherwise, the procedure may progress to step 812.

The color palette generation module 224 (FIG. 2) may be further configured to generate color palette hierarchies in which there is a granularity target for a maximum number of the items 208 for which each palette color in a lowest level is representative. For example, some palette colors in the first level of the color palette hierarchy may be representative for many thousands of the items 208. Whereas it may be a granularity target that palette colors in a lowest level of the color palette hierarchy be representative of at most tens of the items 208. At step 812, it may be determined if the granularity target has been achieved. If the granularity target for the color palette hierarchy being generated has been achieved, the procedure may progress to one or more steps not shown in FIG. 8. Otherwise, the procedure may progress to step 814.

At step 814, the color signature aggregate may be re-clustered at a granularity finer (e.g., having more clusters) than the clustering of step 806 and/or a previous re-clustering. The new set of clusters identified by step 814 may overlap the previous set of clusters, for example, as determined by circles in the color space enclosing the cluster points. As described above with reference to step 808, colors may be selected from the clusters to be palette colors in a next level of the color palette hierarchy being generated. Palette colors selected for the next level of the color palette hierarchy may be added to the hierarchy as child nodes of palette colors corresponding to clusters which overlap the clusters to which they correspond. The color palette generation module 224 (FIG. 2) may be further configured to generate color palette hierarchies in which a number of child nodes of any palette color is less than a threshold. Accordingly, this threshold may correspond to a cluster overlap limit. At step 816, it may be determined if the cluster overlap limit has been reached. If, during the course of the re-clustering of step 814, the cluster overlap limit has been reached, the procedure may progress to step 808 to add palette colors corresponding to the current re-clustering to the next level of the color palette hierarchy being generated. Otherwise, the procedure may return to step 814 to re-cluster to a finer granularity. In at least one embodiment, step 814 and step 816 may be integral. For example, the re-clustering of step 814 may include and/or be implemented at least in part by splitting and joining of clusters.

Figure 9:
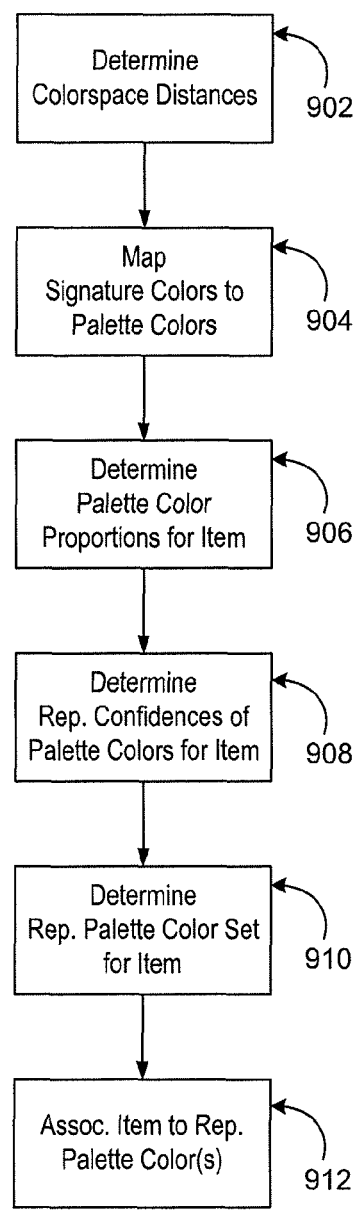
FIG. 9 is a flowchart depicting example steps for updating a palette color map in accordance with at least one embodiment.

Regardless of whether a particular color palette hierarchy is automatically generated or manually specified, the color signature determined for one of the items 208 (FIG. 2), for example, at step 712 of FIG. 7, may be utilized to determine a set of palette colors in the color palette hierarchy which are representative of (i.e., a representative palette color set for) the item and/or one or more of its associated images. The set of palette colors that are representative for the item may be recorded in one of the color palette maps 216 corresponding to the color palette hierarchy. FIG. 9 depicts example steps for updating a palette color map in accordance with at least one embodiment. Further example steps in accordance with at least one embodiment may be obtained by replacing the term "the item" with "one or more images associated with the item" in the description below.

At step 902, distances in a color space between colors in the color signature for the item and palette colors in the color palette hierarchy may be determined, for example, by the color palette mapping module 222 of FIG. 2. At step 904, the colors in the color signature for the item may be mapped to palette colors in the color palette hierarchy. For example, the color palette mapping module 222 may map each color in the color signature to a palette color that is nearest in the color space based at least in part on the color space distances determined at step 902. In conjunction with one or more steps described above with reference to FIG. 7, step 904 may enable an identification of each palette color in the color palette hierarchy corresponding to one or more pixels of associated images.

At step 906, a representative proportion may be determined for each palette color with respect to the item. For example, the color palette mapping module 222 (FIG. 2) may determine normalized statistical frequencies for each palette color with respect to the item. The statistical frequency of a particular palette color with respect to the item may be based at least in part on the statistical frequencies of colors in the color signature that were mapped to the palette color at step 904. For example, the statistical frequencies of colors in the color signature may be summed to determine a statistical frequency for the palette color. In conjunction with one or more steps described above with reference to FIG. 7, step 906 may enable a determination of a proportion of pixels in associated images corresponding to each palette color.

At step 908, a representative confidence score may be determined for each palette color with respect to the item. For example, the color palette mapping module 222 (FIG. 2) may determine the representative confidence score of a particular palette color for the item based at least in part on the representative proportion determined at step 906 and/or the distances in the color space between the colors in the item's color signature and the palette color. In determining the representative confidence score, distances associated with color signature colors that were mapped to the palette color at step 904 may be weighted more heavily. For example, the representative confidence score may be a linear or nonlinear function of the distances weighted by the representative proportion. The representative confidence score may be number such as an integer or a real number.

At step 910, a representative palette color set for the item may be determined. For example, the color palette mapping module 222 (FIG. 2) may select the representative palette color set from the palette colors of the color palette hierarchy based at least in part on the representative proportions determined at step 906 and/or the representative confidences determined at step 908. Due at least in part to the hierarchical nature of the color palette hierarchy, association of the item to a lower level palette color may be considered an association to its parent nodes in the color palette hierarchy. Example steps for determining the representative palette color set for the item in accordance with at least one embodiment are described in more detail below with reference to FIG. 10. In conjunction with one or more steps described above with reference to FIG. 7, step 910 may enable definition of a representative set of palette colors for associated images. At step 912, the representative palette color set determined at step 910 may be associated with the item in the data store 202. For example, the color palette mapping module 222 may update the associations in one of the color palette maps 216 corresponding to the color palette hierarchy.

Figure 10:
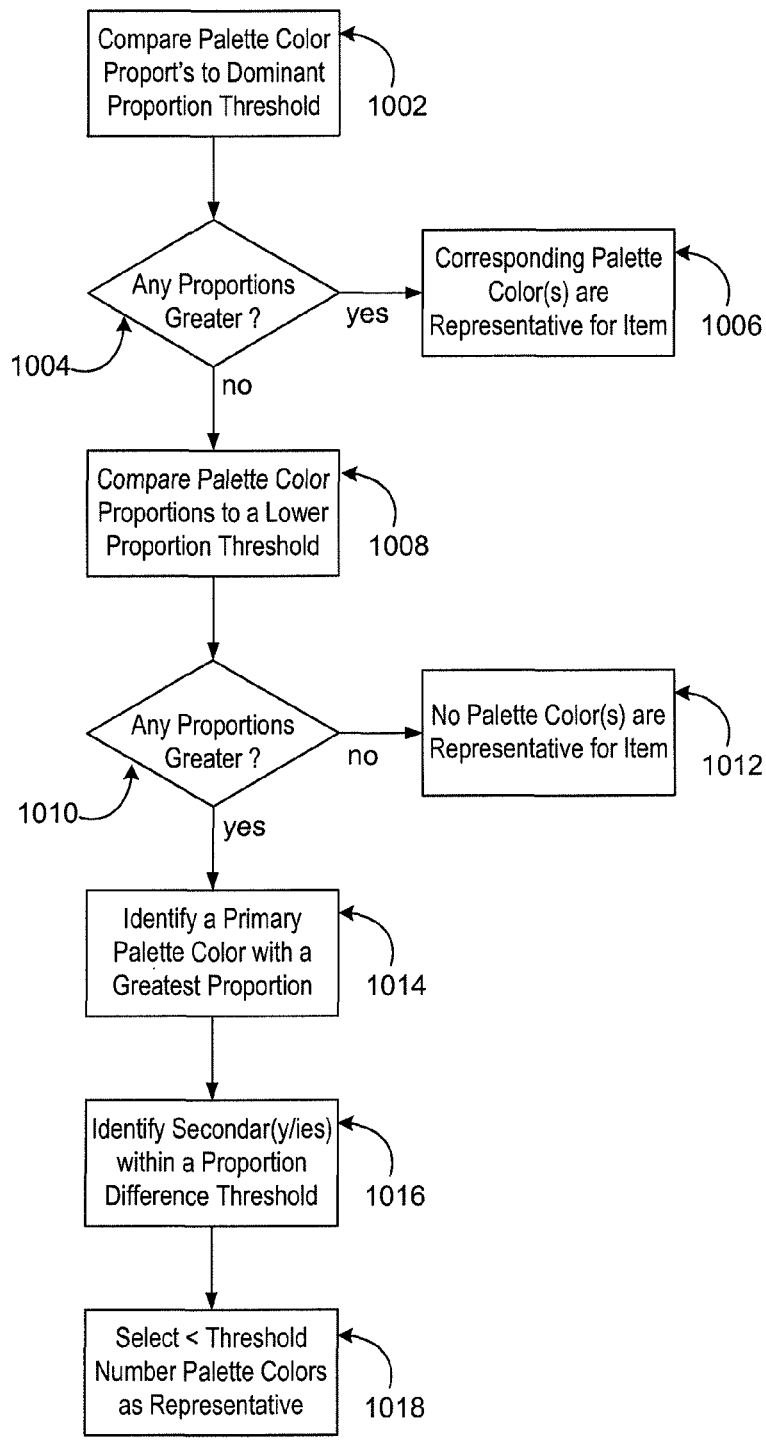
FIG. 10 is a flowchart depicting example steps for determining a representative palette color set for an item in accordance with at least one embodiment.

FIG. 10 depicts example steps for determining the representative palette color set for the item in accordance with at least one embodiment. For example, the steps depicted in FIG. 10 may be performed with respect to the set of palette colors in a particular color palette hierarchy. Alternatively, or in addition, the steps of FIG. 10 may be performed repeatedly with respect to different subsets of palette colors in the color palette hierarchy such as different levels of the color palette hierarchy and/or grayscale palette colors and non-grayscale palette colors. At step 1002, the representative proportion determined for each palette color at step 906 (FIG. 9) may be compared to a dominant proportion threshold, for example, by the color palette mapping module 222 (FIG. 2). The dominant proportion threshold may be, for example, 50%. At step 1004, it may be determined if any of the representative proportions of the palette colors is greater than the dominant proportion threshold. If one or more of the representative proportions of the palette colors is greater than the dominant proportion threshold, then a procedure incorporating step 1004 may progress to step 1006. Otherwise, the procedure may progress to step 1008. At step 1006, the one or more palette colors having representative proportions greater than the dominant proportion threshold may be selected as representative palette colors for the item.

At step 1008, the representative proportion determined for each palette color at step 906 (FIG. 9) may be compared to a lower proportion threshold, for example, by the color palette mapping module 222 (FIG. 2). The lower proportion threshold may be, for example, 5%. At step 1010, it may be determined if any of the representative proportions of the palette colors is greater than the lower proportion threshold. If none of the representative proportions of the palette colors is greater than the lower proportion threshold, then the procedure may progress to step 1012. Otherwise, the procedure may progress to step 1014. At step 1012, it may be determined that none of the palette colors are sufficiently representative of the item.

At step 1014, a primary palette color of the palette colors having a greatest representative proportion may be identified. For example, the color palette mapping module 222 (FIG. 2) may select one of the palette colors having a greatest representative proportion as the primary palette color. At step 1016, one or more further palette colors may be identified as secondary palette colors. For example, ones of the palette colors having a representative proportion within a proportion difference threshold (e.g., 5%) of the representative proportion of the primary palette color may be identified as secondary palette colors by the color palette mapping module 222. At step 1018, the primary palette color and zero or more of the secondary palette colors may be selected as representative palette colors for the item. For example, the color palette mapping module 222 may select less than a threshold number of the primary and/or secondary palette colors as representative. In at least one embodiment, step 1016 and 1018 are integral. For example, the color palette mapping module 222 may select palette colors having representative proportions nearest to the representative proportion of the primary palette color until the threshold number is reached.

Alternatively, or in addition, one or more palette multicolors may be selected as representative at step 1018. The color palette mapping module 222 may be configured to identify primary and secondary palette colors having particular representative proportion patterns (e.g., ratio patterns) as corresponding to particular palette multicolors. For example, a primary palette color and a secondary palette color having representative proportions within a proportion difference threshold may be identified as corresponding to a particular palette multicolor.

Figure 11:
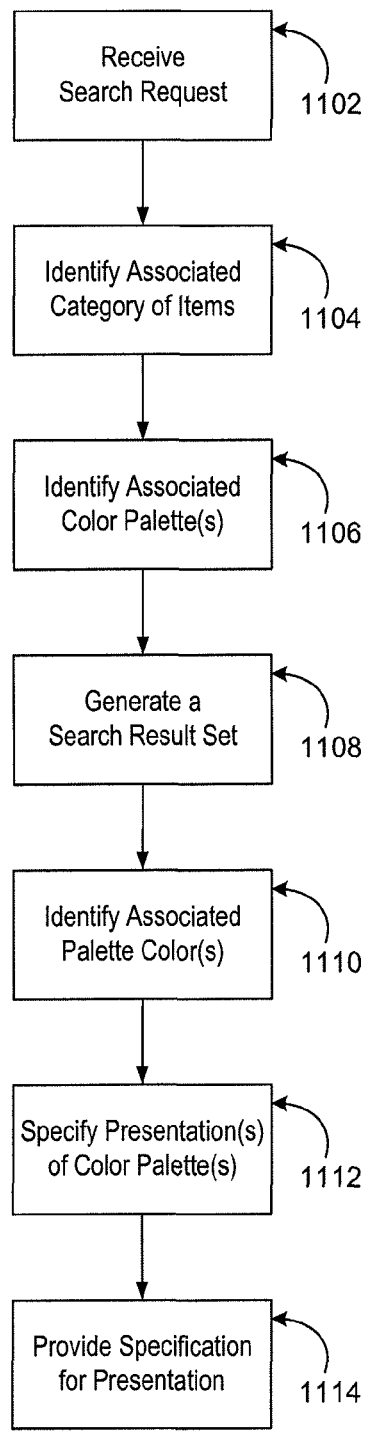
FIG. 11 is a flowchart depicting example steps for processing a search request in accordance with at least one embodiment.

Color palette maps 216 (FIG. 2) may be utilized to facilitate color-aware search of the items 208. FIG. 11 depicts example steps for processing a search request in accordance with at least one embodiment. At step 1102, a search request may be received. For example, the client device 102 (FIG. 1) may submit the search request responsive to the user interface 400, and the search request may be received by the search module 206.

At step 1104, one or more item categories may be identified as associated with the search request. For example, the search module 206 (FIG. 2) may identify an item category in one of the item category hierarchies 212 as associated with the search request.

The search request may be one of a series contributing to a search and/or a search context and, for example, the item category may have been previously explicitly associated with the search. At step 1106, one or more of the color palette hierarchies 214 may be identified as associated with the search request. For example, the search module 206 may identify color palette hierarchies 214 based at least in part on the one or more item categories identified at step 1104, one or more geo-temporal parameters as described above, and/or suitable combinations thereof. Alternatively, a single color palette hierarchy may be established for the system 200.

At step 1108, a search result set may be generated responsive to the search request. For example, the search request may include one or more search terms and the search module 206 (FIG. 2) may utilize any suitable conventional search technique to include at least references to relevant ones of the items 208 in the search result set. As is conventional, the search result set may be ordered by relevance. At step 1110, a set of palette colors associated with items 208 at least referenced by the search result set may be identified. For example, the search module 206 may map the items 208 at least referenced by the search result set to associated palette colors with the one of the color palette maps 216 associated with each color palette hierarchy identified at step 1106. Each such palette color may be included in the set palette colors associated with the search result set.

At step 1112, one or more presentations of each color palette hierarchy may be specified. For example, the color palette UI module 228 (FIG. 2) may specify the presentation (s) based at least in part on the set of palette colors associated with the search result set identified at step 1110. In particular, the set of palette colors associated with the search result set may correspond to color palette presentation elements such as the distinctive presentation region 510 of FIG. 5 and/or the distinctive presentation region 618 of FIG. 6. The color palette hierarchy presentation 600 of FIG. 6 is an example of the presentation(s) that may be specified at step 1112. At step 1114, the specification(s) of the presentation(s) generated at step 1112 may be provided. For example, the search module 206 may provide the specification(s) of the presentation(s) to the client device 102 as part of a specification of the user interface 400 (FIG. 4).

Figure 12:
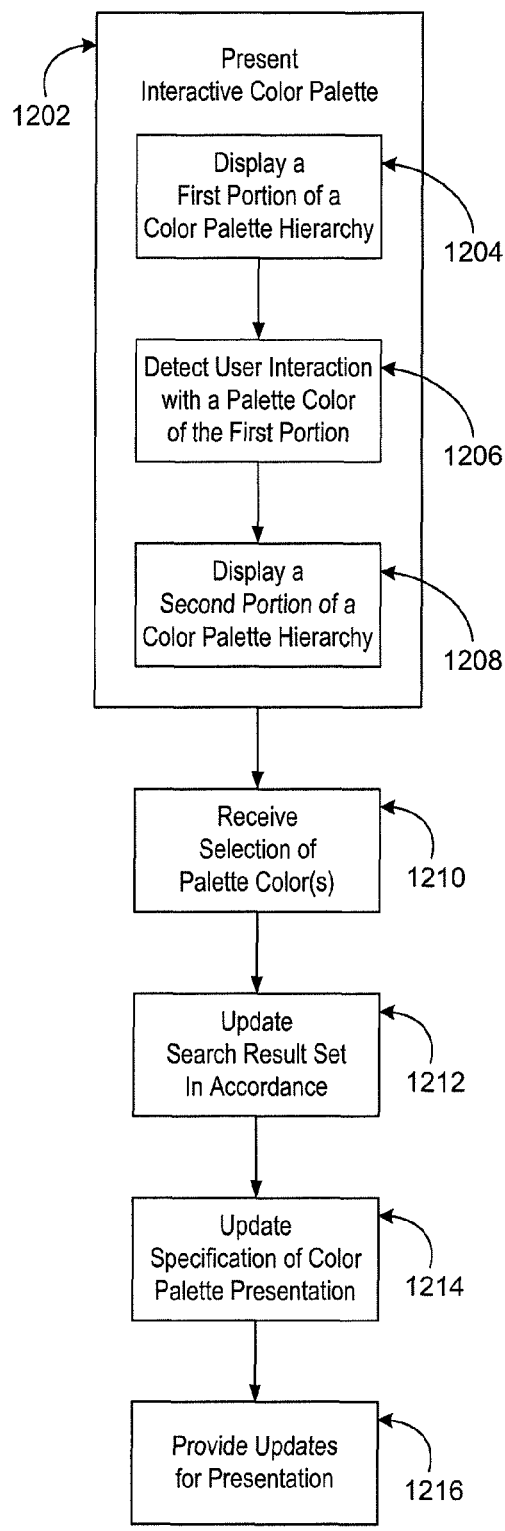
FIG. 12 is a flowchart depicting example steps for facilitating a user interface in accordance with at least one embodiment.

FIG. 12 depicts example steps for facilitating the user interface 400 (FIG. 4) in accordance with at least one embodiment. At step 1202, an interactive color palette may be presented. For example, the client device 102 (FIG. 1) may present the interactive color palette 500 (FIG. 5) as part of the user interface 400. FIG. 12 depicts example steps 1204, 1206, 1208 that may be performed as at least a part of a performance of step 1202.

At step 1204, a first portion of a color palette hierarchy may be displayed. For example, the client device 102 (FIG. 1) may display palette colors 306, 308, 310, 312 of the color palette hierarchy 300 (FIG. 2) as depicted by the color palette hierarchy presentation 500 of FIG. 5. At step 1206, user interaction with a palette color of the displayed first portion may be detected. For example, the client device 102 may detect user interaction with (e.g., moving a mouse over) the brown palette color presentation 504. At step 1208, a second portion of the color palette hierarchy may be displayed. For example, responsive to the detection of step 1206, the client device 102 may cause the palette colors 324, 330, 332, 338 of the color palette hierarchy 300 to be displayed as depicted by the color palette hierarchy presentation 600 of FIG. 6.

At step 1210, a selection of one or more palette colors may be received. For example, the user of the client device 102 (FIG. 1) may select one or more of the palette color presentations 610, 612, 614, 616 (FIG. 6) with the user interface 400 (FIG. 4), and the client device 102 may send corresponding palette color specifications to the color palette UI module 228 (FIG. 2), which may receive and parse the palette color specifications. In at least one embodiment, selecting a palette color higher in the color palette hierarchy may also select each palette color in the sub-hierarchy rooted at the selected palette color, that is, may recursively select child nodes of the selected palette color in the hierarchy. At step 1212, a search result set may be updated in accordance with the selection of one or more palette colors received at step 1210. For example, the search module 206 may refine the search result set to include at least references those items 208 for which the selected one or more palette colors are representative. Alternatively, or in addition, the search module 206 may re-order the search result set to rank higher (e.g., in presentation order) those items for which the selected one or more palette colors are representative.

At step 1214, a specification of a color palette presentation may be updated. For example, the color palette UI module 228 (FIG. 2) may update the specification of the color palette hierarchy presentation generated at step 1112 of FIG. 12. In particular, the color palette UI module 228 may update the number and/or selection of palette colors in the presentation, and/or any distinctive presentation regions emphasizing one or more of the presented palette colors. At step 1216, the updates may be provided for presentation. For example, the search module 206 may provide the updated color palette hierarchy presentation specification to the client device 102 for presentation in the user interface 400 of FIG. 4.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for searching a collection of content associated with a plurality of images, comprising:
under control of one or more computer systems configured with executable instructions,
for each of the plurality of images, identifying each palette color from a color palette corresponding to at least one pixel in the image;
determining a proportion of pixels in each image corresponding to each identified palette color;
defining a representative set of palette colors for each image, the representative set for each image including a primary palette color for which the proportion of pixels is greatest for the image, the representative set further including any secondary palette color for which the proportion of pixels has a difference less than a proportion difference threshold with respect to the primary palette color; and
responsive to receiving information for a search request specifying at least one of the palette colors of the color palette, providing search results including at least a reference to content associated with each of at least some of the plurality of images satisfying the search request based at least in part upon the representative set of palette colors for the image.

2. A computer-implemented method according to claim 1, wherein the proportion of pixels in each image is with respect to a number of pixels in a representative set of pixels selected from the image for an item.

3. A computer-implemented method according to claim 1, wherein determining that the pixel corresponds to the palette color comprises determining a distance between a color of the pixel and the palette color in a color space.

4. A computer-implemented method according to claim 1, wherein the proportion of pixels for any secondary palette color included in the representative set is furthermore greater than a proportion threshold.

5. A computer-implemented method for color-aware search, comprising:
under control of one or more computer systems configured with executable instructions,
identifying a set of representative pixels in an image of an item based at least in part on identifying one or more edges in the image;
selecting a set of representative palette colors from a color palette based at least in part on at least one color of the set of representative pixels, wherein selecting the set of representative palette colors comprises applying a set of weights to statistical frequencies of colors corresponding to colors of the set of representative pixels, and wherein the set of weights bias against selecting grayscale colors for the set of representative palette colors; and
providing at least a reference to the item responsive to a search at least specifying one of the set of representative palette colors.

6. A computer-implemented method according to claim 5, wherein the method further comprises quantizing colors of pixels in the image in accordance with a human visual system model prior to selecting the set of representative palette colors.

7. A computer-implemented method according to claim 5, wherein identifying the set of representative pixels in the image comprises:
identifying an outline at least in part by detecting edges while working inwards from image boundaries; and
detecting edges while working outwards from a center of the outline.

8. A computer-implemented method according to claim 5, wherein selecting the set of representative palette colors comprises determining statistical frequencies of colors corresponding to colors of the set of representative pixels.

9. A computer-implemented method for color-aware search, comprising:
under control of one or more computer systems configured with executable instructions,
identifying a palette color from a color palette corresponding to at least one pixel in an image;
determining a portion of pixels in the image, the corresponding to each identified palette color;
defining a representative set of palette colors for the image, the representative set for the image including a primary palette color for which the proportion of pixels is greatest for the image, the representative set further including any secondary palette color for which the proportion of pixels has a difference less than a proportion difference threshold with respect to the primary palette color;
responsive to receiving a search request specifying at least one of the palette colors of the color palette, providing set search results for presentation based at least in part on the representative set of palette colors for the image.

10. A computer-implemented method according to claim 9, wherein the image corresponds with at least one item in an advertisement.

11. A computer-implemented method according to claim 9, wherein at least one of the representative set of palette colors is a palette multicolor.

12. A computer-implemented method according to claim 9, wherein the proportion of pixels for any secondary palette color included in the representative set is furthermore greater than a proportion threshold.

13. A computer-implemented method according to claim 9, wherein the method further comprises quantizing colors of pixels in the image in accordance with a human visual system model prior to defining the representative set of palette colors.

14. A computerized system for color-aware search, comprising:
one or more computer-readable media collectively facilitating storage of at least a color palette hierarchy comprising a plurality of palette colors arranged in a plurality of levels;
a color palette module configured at least to associate items to representative palette colors in the color palette hierarchy based at least in part on colors in images of the items; and
a search module configured at least to provide for presentation at least references to at least some of the items responsive to a search at least specifying a representative palette color in the color palette hierarchy, wherein each of said at least some of the items is associated with at least one representative palette color in a subhierarchy of the color palette hierarchy that contains the representative palette color specified by the search.

15. A computerized system according to claim 14, wherein a number of palette colors linked to a palette color that is higher in the color palette hierarchy is less than a threshold.

16. A computerized system according to claim 14, wherein each item is associated with at least one of the representative palette colors at each level of the color palette hierarchy.

17. A computerized system according to claim 14, wherein at least one of the plurality of palette colors is a palette multicolor.

18. One or more computer-readable media having collectively thereon computer-executable instructions that configure one or more computers to collectively, at least:
generate a color palette of palette colors based at least in part on colors from images of items, wherein the color palette comprises a color palette hierarchy having a plurality of levels, and wherein generating the color palette comprises re-clustering the colors from images for each of the levels of the color palette hierarchy;
associate at least some of the items to representative palette colors in the color palette based at least in part on at least some of the colors in at least some of the images of said at least some of the items; and
provide at least a reference to associated items responsive to a search at least specifying a representative palette color in the color palette.

19. One or more computer-readable media according to claim 18, wherein generating the color palette comprises clustering the colors from images.

20. One or more computer-readable media according to claim 19, wherein the clustering occurs with respect to distances between the colors in a color space in accordance with a human visual system model.

21. One or more computer-readable media according to claim 20, wherein the color space is modified by at least a color palette type transformation.

* * * * *